United States Patent
Yi et al.

(10) Patent No.: US 9,066,280 B2
(45) Date of Patent: Jun. 23, 2015

(54) METHOD FOR RESTRICTING THE CELL ACCESS OF A TERMINAL IN A WIRELESS COMMUNICATION SYSTEM, AND APPARATUS THEREFOR

(75) Inventors: Seungjune Yi, Anyang-si (KR);
Youngdae Lee, Anyang-si (KR);
Sungduck Chun, Anyang-si (KR);
Sungjun Park, Anyang-si (KR);
Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 13/979,124

(22) PCT Filed: Jan. 10, 2012

(86) PCT No.: PCT/KR2012/000225
§ 371 (c)(1),
(2), (4) Date: Jul. 10, 2013

(87) PCT Pub. No.: WO2012/096490
PCT Pub. Date: Jul. 19, 2012

(65) Prior Publication Data
US 2013/0288679 A1 Oct. 31, 2013

Related U.S. Application Data

(60) Provisional application No. 61/431,411, filed on Jan. 10, 2011.

(51) Int. Cl.
*H04W 48/16* (2009.01)
*H04W 48/08* (2009.01)
*H04W 48/02* (2009.01)

(52) U.S. Cl.
CPC .............. *H04W 48/16* (2013.01); *H04W 48/08* (2013.01); *H04W 48/02* (2013.01)

(58) Field of Classification Search
USPC ......... 455/432.1, 435.1–435.3, 450; 370/230, 370/252, 328, 331
See application file for complete search history.

(56) References Cited

U.S. PATENT DOCUMENTS

2008/0227453 A1* 9/2008 Somasundaram et al. .... 455/436

FOREIGN PATENT DOCUMENTS

| KR | 10-2009-0008469 A | 1/2009 |
| KR | 10-2009-0061244 A | 6/2009 |
| KR | 10-2010-0016463 A | 12/2010 |

OTHER PUBLICATIONS

Catt, "Wait timer extension for CN overload control", 3GPP TSG RAN WG2 Meeting #72, R2-06320, Nov. 19, 2010.
ZTE, "Extension of Wait Time after RRC Connection Reject", 3GPP TSG RAN WG2 #71, R2-105365, Oct. 15, 2010.

* cited by examiner

*Primary Examiner* — Sam Bhattacharya
(74) *Attorney, Agent, or Firm* — McKenna Long & Aldridge LLP

(57) ABSTRACT

The present application relates to a method in which a terminal performs a cell access procedure in a wireless communication system. More particularly, the method comprises: a step of receiving, from a first cell, a message including one or more access-restricting network identifiers or one or more access-restricting area identifiers: a step of restricting, for a predetermined period of time, access to at least one second cell belonging to the network corresponding to said one or more access-restricting network identifiers or the area corresponding to said one or more access-restricting area identifiers, as well as access to said first cell; and a step of restarting access to the first cell and to said at least one second cell after said predetermined period of time elapses.

8 Claims, 10 Drawing Sheets

FIG. 3
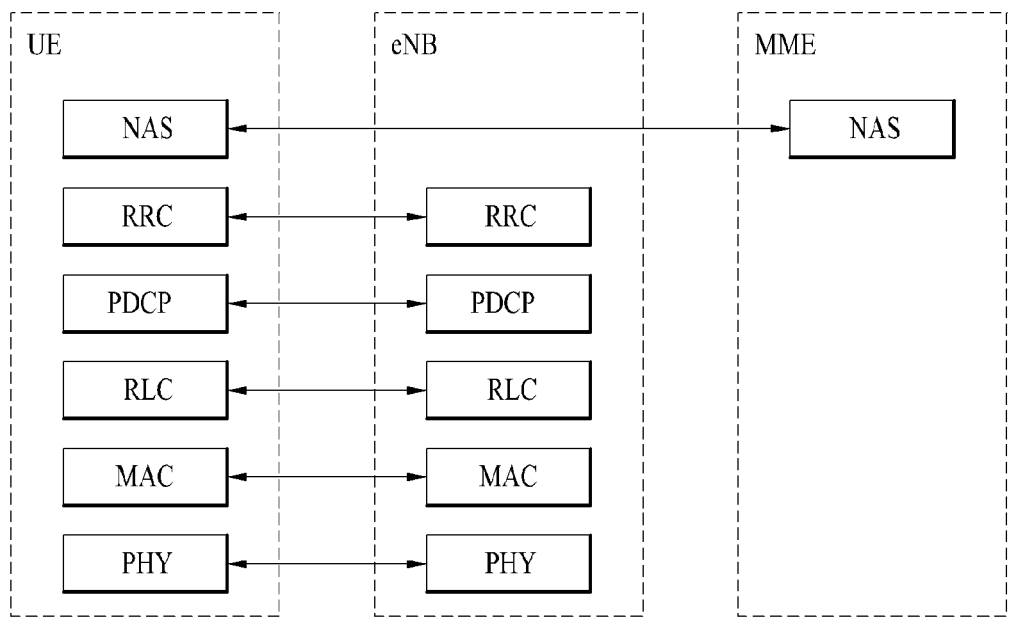
(a) Control plane protocol stack
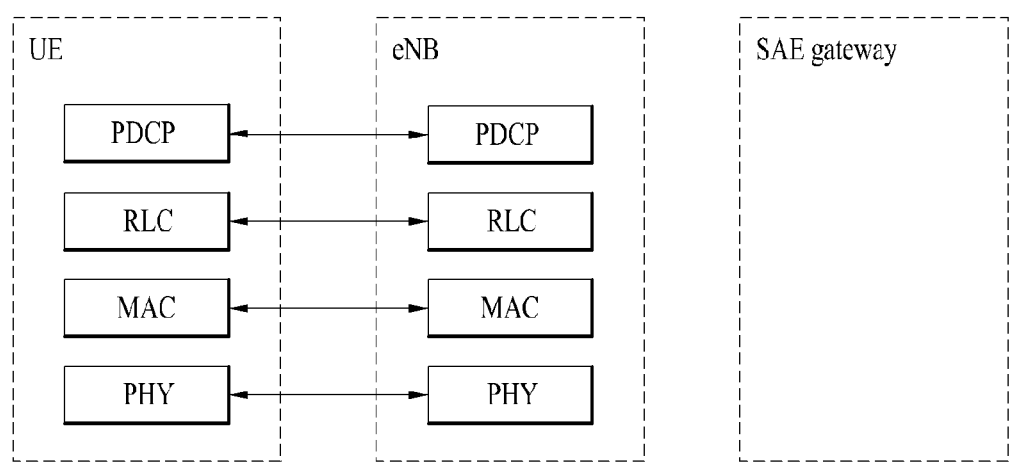
(b) User plane protocol stack

METHOD FOR RESTRICTING THE CELL ACCESS OF A TERMINAL IN A WIRELESS COMMUNICATION SYSTEM, AND APPARATUS THEREFOR

This Application is a 35 U.S.C. §371 National Stage Entry of International Application No. PCT/KR2012/000225, filed Jan. 10, 2012 and claims the benefit of U.S. Provisional Application No. 61/431,411, filed Jan. 10, 2011, all of which are incorporated by reference in their entirety herein.

TECHNICAL FIELD

The present invention relates to a wireless communication system, and more particularly, to a method of restricting a cell access of a delay tolerant access supportive of user equipment in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE (long term evolution) system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of restricting a cell access of a delay tolerant access supportive of user equipment in a wireless communication system and an apparatus therefor.

More specifically, a user equipment establishing or attempting an RRC connection to an eNB receives an RRC connection release message or an RRC connection reject message from the eNB and obtains a network identifier or area identifier from the received message. If the user equipment receives the identical network identifier or the identical area identifier from a $2^{nd}$ eNB, the present invention proposes a method of restricting an access to a cell of the $2^{nd}$ eNB and an apparatus therefor to solve a problem of a related art.

TECHNICAL SOLUTION

To achieve these and other advantages and in accordance with the purpose of the present invention, as embodied and broadly described, a method of performing a cell access procedure at a user equipment in a wireless communication system includes the steps of receiving a message including at least one network identifier for restricting an access or at least one area identifier for restricting the access from a first cell, restricting the access to the first cell and at least one second cell while a predefined timer is running, wherein the at least one second cell belongs to one of a network corresponding to the at least one network identifier or an area corresponding to the at least one area identifier, and resuming the access to the first cell and the at least one second cell, when the predefined timer is expired. Preferably, information on the predefined timer is included in the message.

In this case, restricting the access includes restricting a transmission of a connection request message to the first cell and the at least one second cell, while the predefined timer is running.

And, the at least one network identifier or the at least one area identifier is transferred to Non-Access Stratum(NAS) layer by Radio Resource Control (RRC) layer and the NAS layer is restricted to generating the request message while the predefined timer is running.

Moreover, the message is a Radio Resource Control (RRC) connection reject message or a RRC connection release message, the at least one network identifier is Public Land Mobile Network(PLMN) Identifier(ID), and the at least one area identifier is one of a Tracking Area ID, a Location Area ID and a Routing Area ID.

And, an establishment cause for the access with the first cell is a delay tolerant access.

Meanwhile, to further achieve these and other advantages and in accordance with the purpose of the present invention, a user equipment in a wireless communication system comprises a reception module configured to receive a message including at least one network identifier for restricting an access or at least one area identifier for restricting the access from a first cell, a processor configured to restrict an access to the first cell and at least one second cell while a predefined timer is running, wherein the at least one second cell belongs to one of a network corresponding to the at least one network identifier or an area corresponding to the at least one area identifier, wherein the processor resumes the access to the first cell and the at least one second cell, when the predefined timer is expired.

ADVANTAGEOUS EFFECTS

According to embodiment of the present invention, it is able to efficiently control a restriction for a cell access of a user equipment supporting a delay tolerant access in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 3 is a diagram for structures of control and user planes of radio interface protocol between a 3GPP radio access network standard-based user equipment and E-UTRAN;

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In the present specification, the embodiments of the present invention are explained using an LTE system and an LTE-A system, which is exemplary only. The embodiments of the present invention are applicable to various communication systems corresponding to the above mentioned definition.

Figure 1:
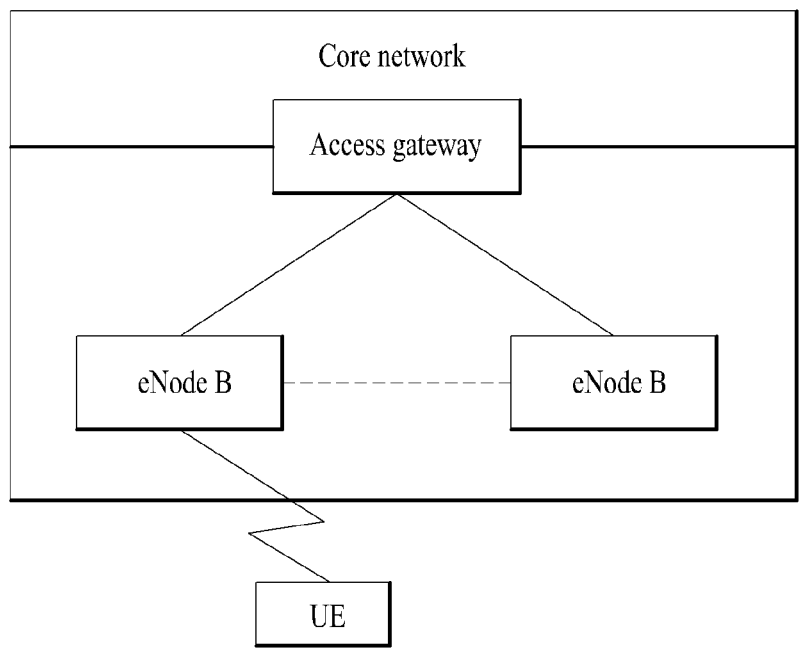
FIG. 1 is a schematic diagram of E-UMTS network structure as one example of a wireless communication system.
Figure 2:
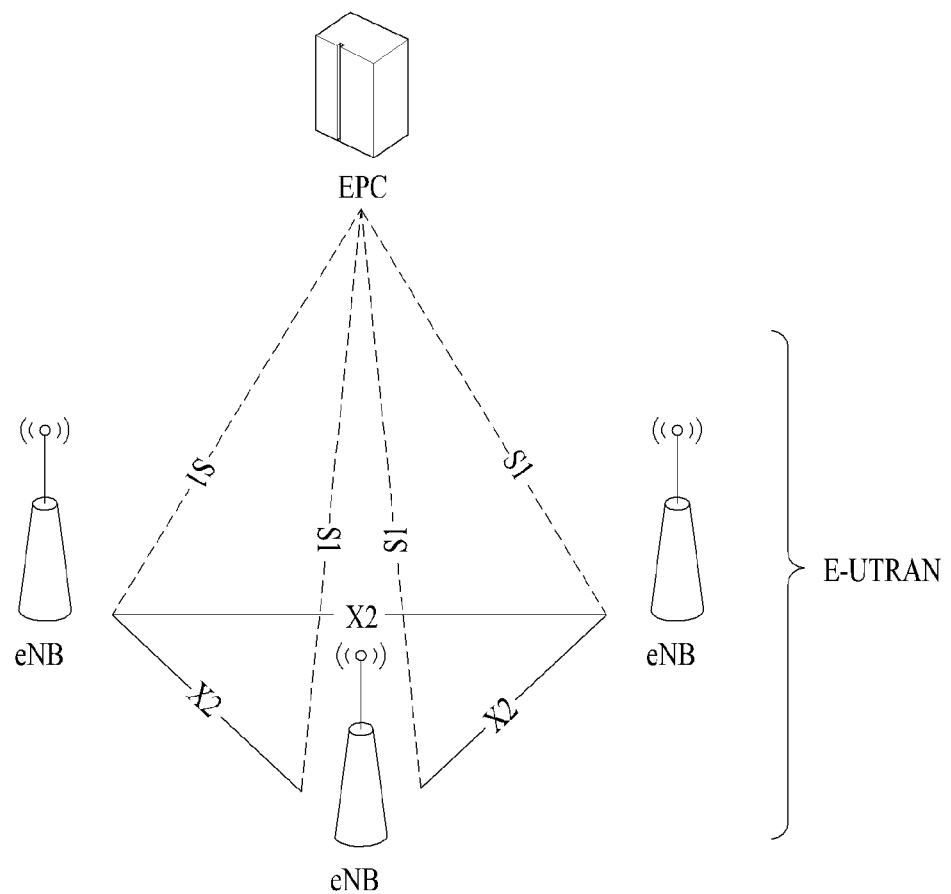
FIG. 2 is a conceptual diagram of E-UTRAN (evolved universal terrestrial radio access network) network structure.

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Meanwhile, an NAS (Non-access stratum) layer situated at the above of an RRC layer performs such a function as a session management and a mobility management and the like. In the NAS layer, two states, which correspond to an EMM (EPS mobility management) registered state (EMM-REGISTERED) and an EMM unregistered state (EMM-UNREGISTERED) are defined for a mobility management of a user equipment. These two states are applied to the user equipment and MME. An initial UE corresponds to the state of the EMM unregistered. The user equipment performs a process of registering to a corresponding network to access the network via an initial attach procedure. If the attach procedure is successfully performed, the user equipment and the MME become the state of EMM registered.

In particular, in the NAS layer, two states, which correspond to an ECM (EPS connection management) idle state (ECM_IDLE) and an ECM connected state (ECM_CONNECTED), are defined to manage a signaling connection between a user equipment and an EPC. These two states are applied to the user equipment and MME. If a user equipment in the state of ECM idle establishes an RRC connection with E-UTRAN, the corresponding user equipment becomes the user equipment in the state of ECM connected. If the MME in the state of ECM idle establishes an S1 connection with E-UTRAN, the MME becomes the MME in the state of ECM connected.

When a user equipment is in a state of ECM idle, E-UTRAN does not have information (context) on the user equipment. Hence, the user equipment in the state of ECM idle performs such a UE-based mobility related procedure as a cell selection, a cell re-selection, or the like without receiving a network command. On the contrary, when a user equipment is in a state of ECM connected, mobility of the user equipment is managed by the network command. If a position of a user equipment in a state of ECM idle changes from the position of which the network is aware, the corresponding position of the user equipment is informed to the network via a TA (tracking area) update process by the user equipment.

In LTE system, a single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
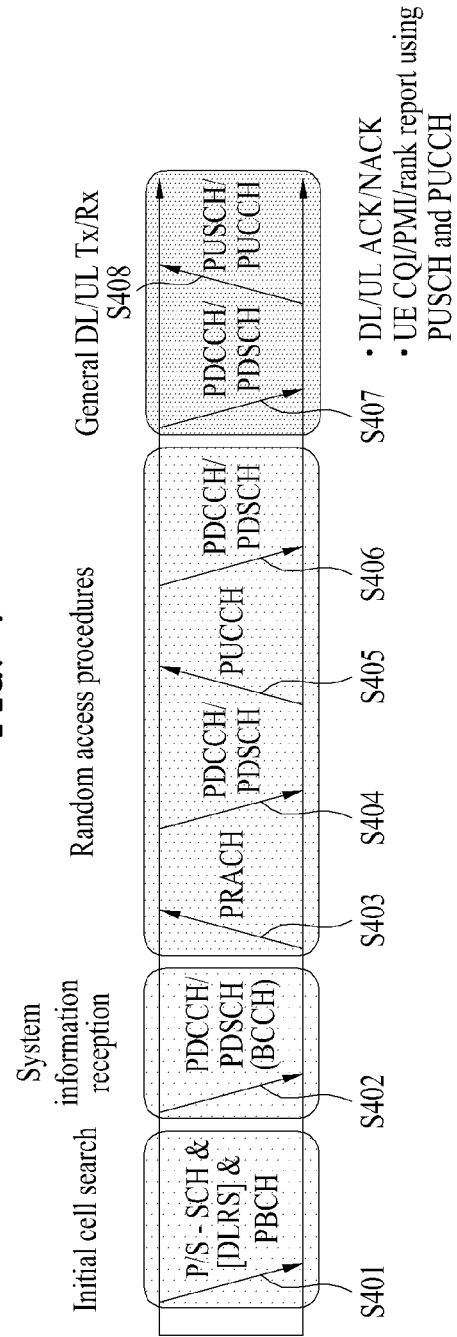
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S401]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S402].

Meanwhile, if a user equipment initially accesses an eNode B or does not have a radio resource for transmitting a signal, the user equipment may be able to perform a random access procedure to complete the access to the base station [S403 to S406]. To this end, the user equipment may transmit a specific sequence as a preamble on a physical random access channel (PRACH) [S403] and may be then able to receive a response message on PDCCH and the corresponding PDSCH in response to the preamble [S404]. In case of a contention based random access procedure (RACH), it may be able to additionally perform a contention resolution procedure.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
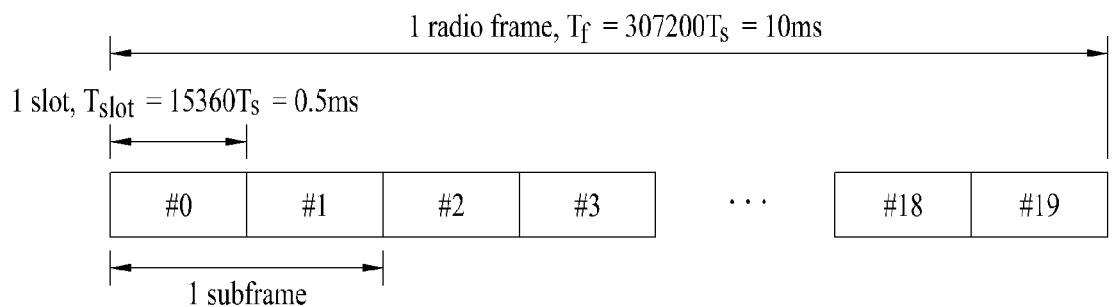
FIG. 5 is a diagram for a structure of a radio frame used in LTE system.

FIG. 5 is a diagram for a structure of a radio frame used in an LTE system.

Referring to FIG. 5, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15\ kHz \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 6:
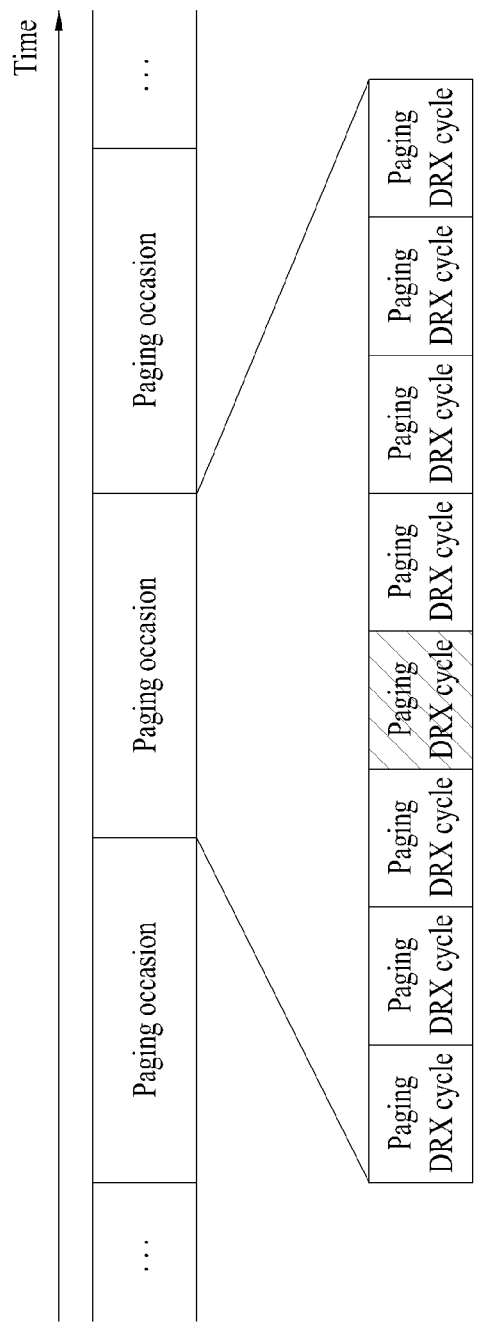
FIG. 6 is a diagram for explaining a general transceiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information a user equipment should know to access a network. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In order to inform the user equipment of whether the system information is modified, the e Node B sends a paging message. In this case, the paging message includes a system information change indicator. The user equipment receives the paging message according to a paging cycle. If the paging message includes the system information change indicator, the user equipment receives the system information transmitted via the BCCH, which is a logical channel.

In the following description, MTC (machine type communication) is explained.

The MTC may generally mean a communication established between a machine and another machine without human involvement. A user equipment used for the MTC is an MTC device. The MTC can be called an M2M (machine to machine). A service provided by the MTC has difference from the service provided by the communication, which is involved by human being. The service provided by the MTC includes the services of various scopes as follows. For instance, the MTC provides such a service as tracking, metering, payment system, health care service, remote controlling, and the like.

Figure 7:
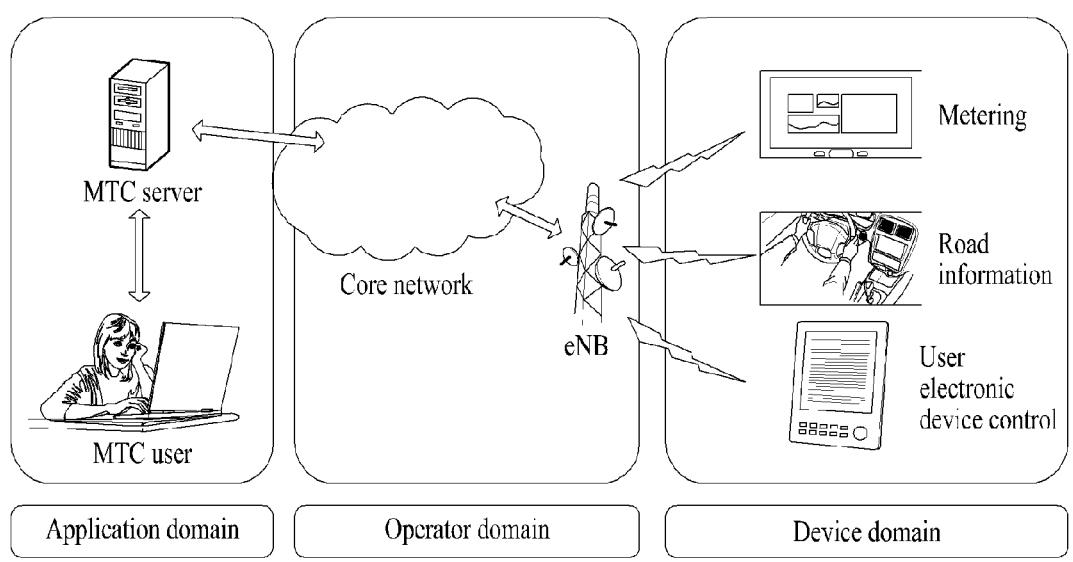
FIG. 7 is a diagram for explaining a structure of an MTC (machine type communication)

FIG. 7 is a diagram for explaining a structure of an MTC (machine type communication).

An MTC device performs a communication with a different MTC device or an MTC server via a mobile communication network. Referring to FIG. 7, the MTC server may be able to provide such a service provided by the MTC device as metering, road information, user electronic device control, and the like to an MTC user.

In order to efficiently support the MTC service, such characteristics of the MTC device as a low mobility of the MTC device, time tolerant (or delay tolerant), latency tolerance, small data transmission, and the like may be considered. For this sort of reason, the MTC device can be called a delay tolerant access supportive of user equipment.

In particular, it may assume that a plurality of MTC devices may exist in a single cell. Hence, in case that a communication service is simultaneously provided to a plurality of the MTC devices, all of the MTC devices should establish an RRC connection with a network.

A lower layer of a user equipment, i.e., an RRC layer receives a delay tolerant access indicator from an upper layer of the user equipment, i.e., a NAS layer. And, the RRC layer of the user equipment includes the delay tolerant access indicator in establishment cause information. If the lower layer of the user equipment transmits an RRC connection request message to a network to make a request for accessing, it is able to transmit the establishment cause information including the delay tolerant access indicator to the network via the RRC connection request message. Having transmitted the RRC connection request message, the user equipment receives an RRC connection setup message from the network and completes an access to the network by transmitting an RRC connection setup complete message.

Yet, according to a legacy technology, since a plurality of devices are trying to establish the RRC connection at the same time, an overload occurs in a mobile communication network and then a problem that a correct service is not provided to the devices occurs. In this case, an eNode B broadcasts such an access restricting information as an ACB (access class barring) and may be then able to prevent the MTC devices from accessing the eNode B.

Figure 8:
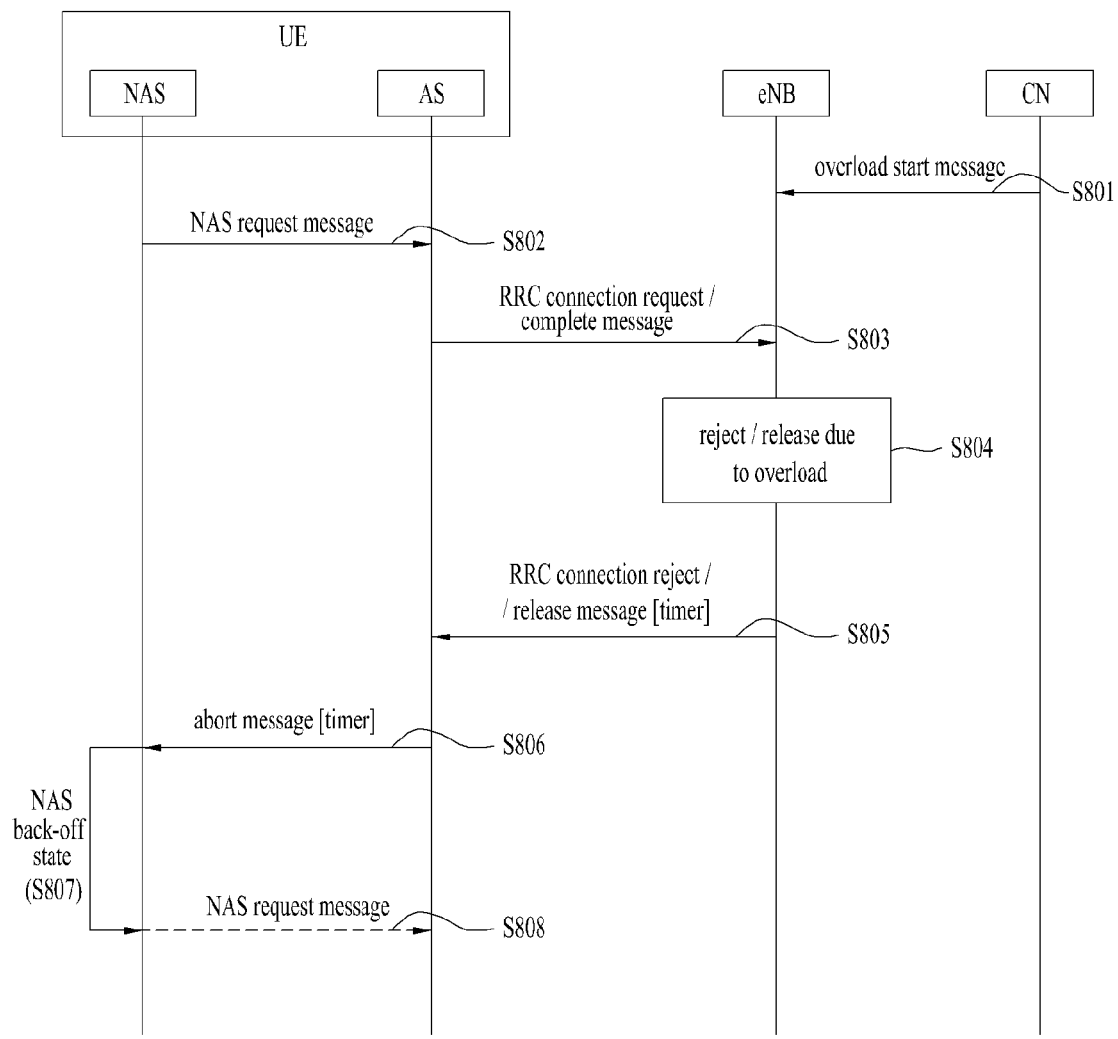
FIG. 8 is a diagram for a method of restricting a cell access of an MTC user equipment according to a conventional technology.

FIG. 8 is a diagram for a method of restricting a cell access of an MTC user equipment according to a legacy technology.

Referring to FIG. 8, since a plurality of devices establish an RRC connection at the same time, in case of occurring an overload in a mobile communication network, an MME of a core network (CN) transmits an overload start message to an eNB [S801].

Meanwhile, a NAS layer of a user equipment transmits a NAS request message to an AS layer, i.e., RRC layer [S802] and the AS layer, i.e., the RRC layer may be able to transmit an RRC connection request message or an RRC connection completion message to an eNB in response to the NAS request message [S803]. In this case, the eNB may be able to control the overload of the core network in a manner of rejecting all RRC connection request messages indicating a specific establishment cause or in a manner of releasing all RRC connections connected by the specific establishment cause. In this case, the specific establishment cause may correspond to a delay tolerant access.

Specifically, the eNB checks the establishment cause included in the received RRC connection request message and if the establishment cause corresponds to the specific establishment cause received from the core network, the eNB rejects the corresponding RRC connection request [S804]. And, the eNB releases the RRC connection if the establishment cause corresponds to the specific establishment cause received from the core network among the currently established RRC connections.

Hence, the eNB may be able to transmit an RRC connection reject message or an RRC connection release message to the RRC layer of the user equipment [S805] and the RRC connection reject message or the RRC connection release message may be able to include information on a standby time for restricting a connection, i.e., a timer.

Having received the aforementioned message, the RRC layer of the user equipment delivers an abort message including the timer to the NAS layer [S806] and the NAS layer of the user equipment transits to a back-off state for the standby time [S807].

Thereafter, if the standby time is expired, the NAS layer of the user equipment may be able to transmit a NAS request message to the RRC layer again [S808].

According to the aforementioned legacy technology, the user equipment cannot transmit the RRC request message to a corresponding cell for the standby time. Yet, in case that the user equipment reselects a new cell, the user equipment may be able to transmit the RRC connection request message to the new cell irrespective of whether the standby time is expired. After reselecting the new cell, if the user equipment attempts to access an identical core network, since the corresponding core network is in a state of overload, there may exist a problem of unnecessary transmitting RRC connection request transmitted by the user equipment.

In order to solve the problem of the legacy technology, the present invention proposes that a user equipment establishing or attempting a connection to an eNB receives an RRC connection reject message or an RRC connection release message from a $1^{st}$ eNB, obtains a network identifier or an area identifier from the received message, and if an identical network identifier or an identical area identifier is received from a $2^{nd}$ eNB, restricts an access to a cell of the $2^{nd}$ eNB. In this case, it is preferable that the user equipment does not transmit the RRC connection request message to the cell of the $2^{nd}$ eNB.

And, the RRC connection reject message or the RRC connection release message includes the information on the standby time and the user equipment restricts an access to a cell broadcasting a corresponding network identifier or a corresponding area identifier for the standby time. In particular, the user equipment does not transmit the RRC connection request message to the cell broadcasting the corresponding network identifier or the corresponding area identifier. In this case, it is preferable that the network identifier or the area identifier is broadcasted via system information in the eNB.

Naturally, the user equipment may be able to select a cell broadcasting a network identifier different from the aforementioned network identifier or an area identifier different from the aforementioned area identifier and may be then able to transmit the RRC connection request message to the selected cell.

The aforementioned network identifier may correspond to a PLMN ID. The public land mobile network (PLMN) ID indicates a network identification number of a mobile communication network service provider. And, the aforementioned area identifier may indicate one of a tracking area ID, a location area ID and a routing area ID.

Figure 9:
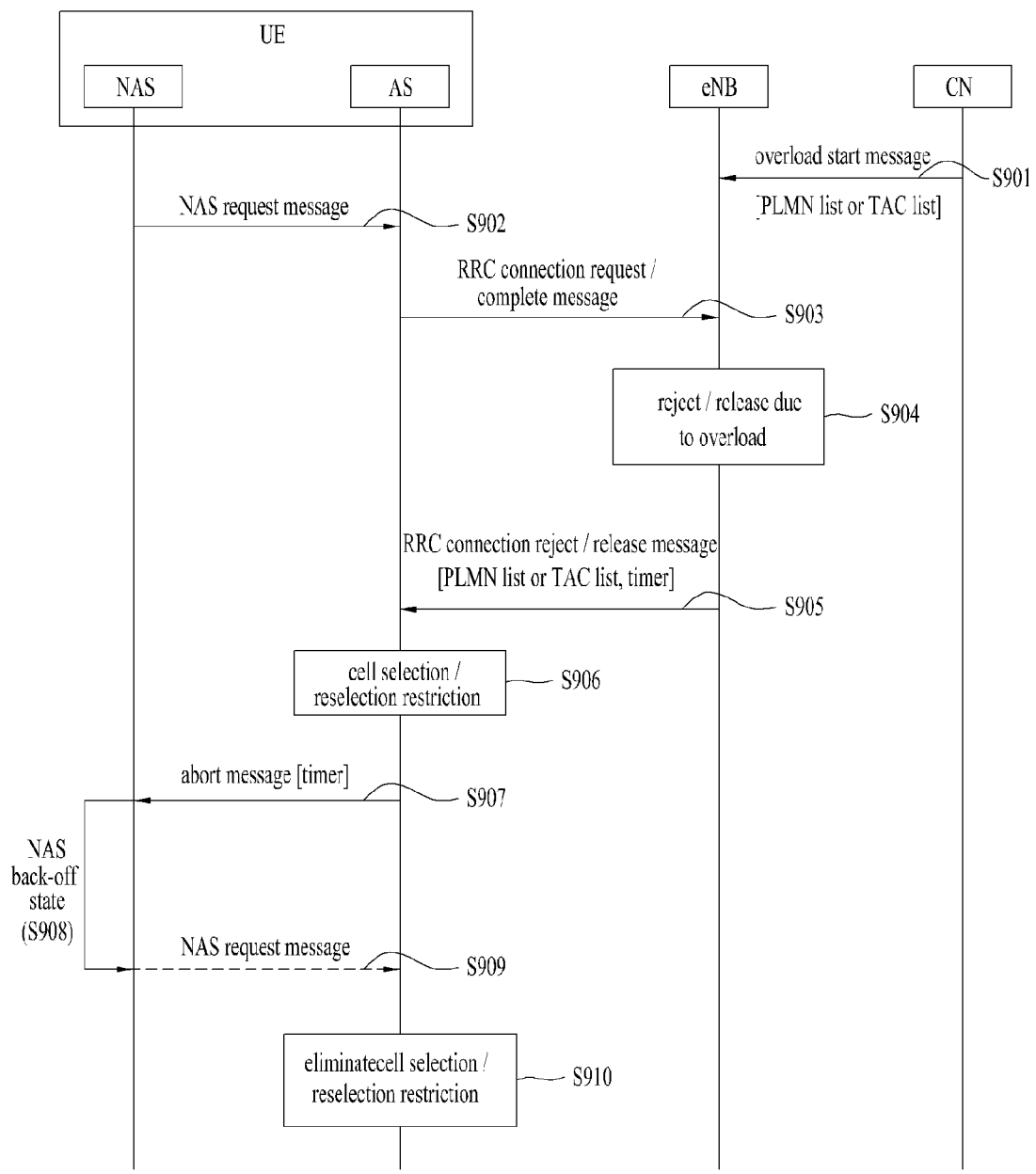
FIG. 9 is a diagram for a method of restricting a cell access of an MTC user equipment according to embodiment of the present invention.

FIG. 9 is a diagram for a method of restricting a cell access of an MTC user equipment according to embodiment of the present invention.

Referring to FIG. 9, if an overload occurs in a mobile communication network, an MME of a core network (CN) transmits an overload start message to an eNB [S901]. In this case, it is preferable that the overload start message includes a network identifier list (or a plurality of network identifier lists) or an area identifier list (or a plurality of area identifier lists).

Meanwhile, a NAS layer of a user equipment transmits a NAS request message to an AS layer, i.e., RRC layer [S902] and the AS layer, i.e., the RRC layer may be able to transmit an RRC connection request message or an RRC connection completion message to an eNB in response to the NAS request message [S903]. In this case, an establishment cause included in the RRC connection request message can be configured as a delay tolerant access.

The eNB checks the establishment cause included in the received RRC connection request message and if the corresponding establishment cause corresponds to the delay tolerant access, the eNB rejects the corresponding RRC connection request [S904]. And, the eNB releases the RRC connection that the establishment cause corresponds to the delay tolerant access among the currently connected RRC connections.

Hence, the eNB may be able to transmit an RRC connection reject message or an RRC connection release message to the RRC layer of the user equipment [S905] and it is preferable that the message includes a network identifier list (or a plurality of network identifier lists) or an area identifier list (or a plurality of area identifier lists). And, the RRC connection reject message or the RRC connection release message may be able to include information on a standby time for restricting a connection, i.e., a timer.

Having received the aforementioned message, the RRC layer of the user equipment starts to restrict an access/re-access to a cell belonging to the networks (e.g., PLMN) indicated by the listed network identifier or the areas (e.g., tracking area) indicated by the listed area identifier [S906].

Preferably, the RRC layer of the user equipment restricts the access/re-access to the corresponding cell for a standby time corresponding to the timer.

To this end, the RRC layer of the user equipment delivers an abort message to the NAS layer [S907]. In this case, the abort message may be able to include the network identifier list or the area identifier list as well as the information on the standby time.

Meanwhile, the RRC layer of the user equipment may be able to perform a cell access restriction described in the following description. 1) An access to the cells of a TA (tracking area) to which the cell transmitted the RRC connection release message or the RRC connection reject message belongs thereto is banned for the standby time by the user equipment and the access restriction is released if the standby time is expired. In this case, the user equipment may be able to know the TA of the cell via system information. 2) And, an access to the cells belonging to the PLMN, which is included in an RRC connection setup complete message, can be banned for the standby time by the user equipment and the access restriction is released if the standby time is expired. The user equipment does not select/reselect the access-restricted cells in the 1) and 2) cases. And, the user equipment does not transmit the RRC connection request message to the access-restricted cells. 3) Meanwhile, the user equipment may be able to stop selecting/reselecting a cell for the standby time. Similarly, the user equipment resumes the selecting/reselecting a cell if the standby time is expired.

Thereafter, the NAS layer of the user equipment transits to a state of back-off for the standby time [S908]. It is preferable that the NAS layer of the user equipment does not generate a request message for the back-off period. Although a request message is generated in the NAS layer, the RRC layer does not transmit an RRC request message to the cells, which belong to the listed network identifier or the listed area identifier.

In case that the standby time is expired, the NAS layer of the user equipment may be able to transmit a NAS request message to the RRC layer again [S909]. As a last step, the RRC layer of the user equipment eliminates the cell access/re-access, which is restricted in the step S906, and may be able to select a new cell via a cell selection or a cell reselection process without an access restriction.

Figure 10:
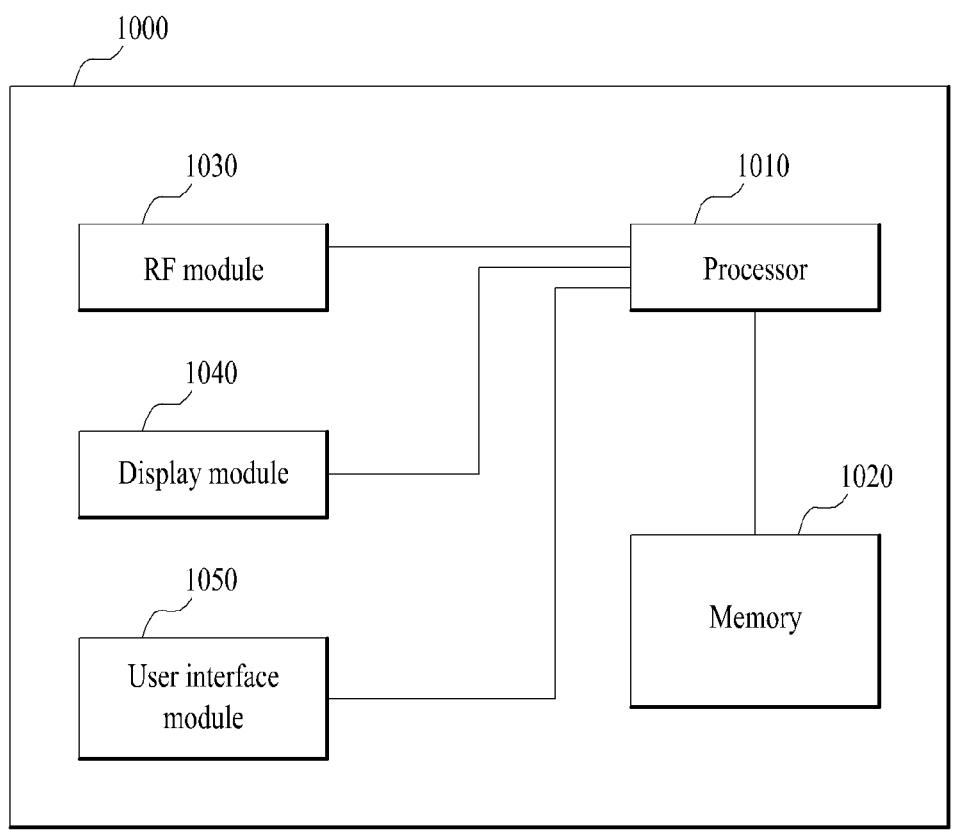
FIG. 10 is a block diagram for a configuration of a communication device according to embodiment of the present invention.

FIG. 10 is a block diagram for a configuration of a communication device according to embodiment of the present invention.

Referring to FIG. 10, a communication device 1000 may include a processor 1010, a memory 1020, an RF module 1030, a display module 1040, and a user interface module 1050.

Since the communication device 1000 is depicted for clarity of description, prescribed module(s) may be omitted in part. The communication device 1000 may further include necessary module(s). And, a prescribed module of the communication device 1000 may be divided into subdivided modules. A processor 1010 is configured to perform an operation according to the embodiments of the present invention illustrated with reference to drawings. In particular, the detailed operation of the processor 1010 may refer to the former contents described with reference to FIG. 1 to FIG. 9.

The memory 1020 is connected with the processor 1010 and stores an operating system, applications, program codes, data, and the like. The RF module 1030 is connected with the processor 1010 and then performs a function of converting a baseband signal to a radio signal or a function of converting a radio signal to a baseband signal. To this end, the RF module 1030 performs an analog conversion, amplification, a filtering, and a frequency up conversion, or performs processes inverse to the former processes. The display module 1040 is connected with the processor 1010 and displays various kinds of informations. And, the display unit 1040 can be implemented using such a well-known component as an LCD (liquid crystal display), an LED (light emitting diode), an OLED (organic light emitting diode) display and the like, by which the present invention may be non-limited. The user interface module 1050 is connected with the processor 1010 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although a method of restricting a cell access of a user equipment in a wireless communication system and apparatus therefor are described with reference to examples applied to 3GPP LTE system, it may be applicable to various kinds of wireless communication systems as well as to the 3GPP LTE system.

What is claimed is:

1. A method for performing a cell access procedure at a user equipment in a wireless communication system, the method comprising:
    transmitting a Radio Resource Control (RRC) connection complete message to a first cell;
    when an establishment cause associated with the RRC connection corresponds to delay tolerant access, receiving a RRC release message from a first cell;
    restricting the access to the first cell and at least one second cell while a predefined timer is running; and
    resuming the access to the first cell and the at least one second cell, when the predefined timer is expired,
    wherein, if the RRC release message includes at least one network identifier for restricting access or at least one area identifier for restricting access, the at least one second cell belongs to one of a network corresponding to the at least one network identifier or an area corresponding to the at least one area identifier; and
    wherein, if the RRC release message does not include at least one network identifier for restricting access or at least one area identifier for restricting access, the at least one second cell belongs to a network corresponding to a network identifier included in the RRC connection complete message.

2. The method according to claim 1, wherein restricting the access includes restricting a transmission of a connection request message to the first cell and the at least one second cell, while the predefined timer is running.

3. The method according to claim 1, wherein information on the predefined timer is included in the RRC release message.

4. The method according to claim 1, wherein the at least one network identifier or the at least one area identifier is transferred to Non-Access Stratum(NAS) layer by Radio Resource Control (RRC) layer.

5. The method according to claim 1, wherein the NAS layer is restricted to generating the request message while the predefined timer is running.

6. The method according to claim 1, wherein the at least one network identifier is Public Land Mobile Network (PLMN) Identifier(ID).

7. The method according to claim 1, wherein the at least one area identifier is one of a Tracking Area ID, a Location Area ID and a Routing Area ID.

8. A user equipment in a wireless communication system, the user equipment comprising:
    a transmitting module configured to transmit a Radio Resource Control (RRC) connection complete message to a first cell;
    a reception module configured to receive a RRC release message from a first cell, when an establishment cause associated with the RRC connection corresponds to delay tolerant access; and
    a processor configured to restrict an access to the first cell and at least one second cell while a predefined timer is running,
    wherein the processor resumes the access to the first cell and the at least one second cell, when the predefined timer is expired,
    wherein, if the RRC release message includes at least one network identifier for restricting access or at least one area identifier for restricting access, the at least one second cell belongs to one of a network corresponding to the at least one network identifier or an area corresponding to the at least one area identifier; and
    wherein, if the RRC release message does not include at least one network identifier for restricting access or at least one area identifier for restricting access, the at least one second cell belongs to a network corresponding to a network identifier included in the RRC connection complete message.

* * * * *